United States Patent Office 3,539,468
Patented Nov. 10, 1970

3,539,468
ALUMINA HYDRATE COMPOSITIONS
James H. Wright, Louisville, Ky., assignor to Catalysts and Chemicals Inc., Louisville, Ky., a corporation of Delaware
No Drawing. Continuation-in-part of application Ser. No. 532,021, Jan. 7, 1966. This application Oct. 25, 1968, Ser. No. 770,783
Int. Cl. B01j 11/06
U.S. Cl. 252—463                     6 Claims

ABSTRACT OF THE DISCLOSURE

Aluminum oxide is widely used in the petroleum and other branches of the chemical industry. Alumina can conveniently be obtained by the Bayer process. However it is crystalline in form and not completely satisfactory for catalytic purposes. Alumina suitable for catalytic purposes is frequently prepared by precipitation from a water soluble metal aluminate by the addition thereto of a mineral acid. A remarkably effective precursor alumina hydrate is prepared by carbon dioxide precipitation if certain reaction conditions are employed.

BACKGROUND OF THE INVENTION

This application is a continuation-in-part of application Ser. No. 532,021, filed Jan. 7, 1966 and now abandoned.

The invention is concerned with alumina hydrate compositions and the preparation of precursor alumina compositions for industrial use. The invention pertains to an alumina for the preparation of alumina extrudates possessing catalytic properties.

Alumina, either as the hydrate, or in the anhydrous form as aluminum oxide, is widely used in the petroleum and many other branches of the chemical industry. It has been employed in the petroleum industry as a catalyst for hydrocarbon conversion processes, as a support for catalytically active materials to be used in hydrocarbon conversion processes, and as a dehydrating agent. It is widely used in other fields of the chemical industry for the same purposes. The activated forms which are considered to be merely modifications of aluminum oxide and its hydrates are especially known for their pronounced catalytic activity and adsorptive capacity. The use of alumina as a refractory is also well known. High purity alumina is also used medicinally. In other uses alumina is mixed or blended with other components to produce substances of modified properties.

Alumina can conveniently be obtained by the well known Bayer process. In this process bauxite is digested with hot sodium hydroxide solution, and the resulting sodium aluminate solution is diluted, cooled and clarified in order to separate out a crystalline alumina hydrate, sometimes designated as aluminum hydroxide. The alumina obtained from the Bayer process is crystalline in form, and is therefore not sufficiently active for catalytic purposes.

Because of the disadvantages of alumina obtained by the Bayer process, alumina of suitable activity for catalytic purposes is frequently prepared by precipitation. A water soluble metal aluminate such as calcium, sodium, potassium or lithium aluminate is reacted with a mineral acid. However, when hydrated alumina is prepared by such precipitation procedures it dries to a light fluffy crystalline material having a very low density. This crystalline alumina is difficult to compound into catalyst shapes, and it tends to disintegrate into smaller and smaller particles during used as a catalyst. As a consequence, modifications of this crystalline alumina hydrate have been obtained by varying conditions of the process.

One process for modifying alumina hydrate precursors, described in U.S. 2,980,632 and U.S. 3,124,418, is to prepare alumina hydrate in a form which is predominantly amorphous. However, the amorphous oxide is a gel. It is filtered only with difficulty, and it has other undersirable properties of gels. The washed precipitate is therefore converted, usually by aging or seeding, from the predominantly amorphous state to a superior crystalline form of alumina hydrate.

Even more desirable aluminas result from procedures which yield a mixture of crystalline and amorphous hydrated aluminas. One such method is described in U.S. 2,973,245. In that process a strong mineral acid salt of aluminum, such as aluminum chloride, is neutralized with ammonium hydroxide; or a strong basic salt of aluminum, such as sodium aluminate, is neutralized with a strong mineral acid such as nitric acid or hydrochloric acid. By neutralizing it is not meant that a pH of 7 is necessarily maintained, but that the final pH of the reaction mixture is from about 7 or 8 to 10. The neutralizing reaction thus provides an alumina hydrate composition which, as formed, is a highly gelatinous precipitate composed primarily of amorphous gelatinous hydrous oxides. This material is washed and converted to a mixture of alumina hydrates containing about 10 to 95 percent crystalline trihydrate by aging in an essentially aqueous medium at a pH of about 7 or 8 to 10 and at a temperature of about 70° F. to 170° F. The process of U.S. 2,973,245 thus provides a mixture of crystalline and non-crystalline aluminas. The non-crystalline alumina is in a state which, after drying, will be an amorphous gelatinous hydrous alumina. The crystalline alumina is a trihydrate phase which can contain one or more of the hydrate forms of bayerite, gibbsite and randomite.

THE INVENTION

By the practice of this invention it has been found that a precursor alumina hydrate which is remarkably effective as a catalyst base can be made using carbon dioxide as the precipitant for one of the water soluble aluminates used in the mineral acid precipitation process as set forth hereinbefore. The alumina resulting is a mixture of crystalline and amorphous phases of alumina hydrate formed without aging and heating. The preferred precursor alumina hydrate of this invention contains a desirable balance of crystalline and amorphous alumina hydrates resulting in a desired low density, and, in the calcined precursor, in a high volume of pores in the size range below 800 A. and a low volume of pores in the size range above 800 A. In this respect the resulting catalyst bases of this invention are superior to those formed from alumina hydrate precursors of comparable density and surface area made by the use of nitric acid. In addition the physical characteristics of the alumina hydrate precursor of this invention are such that the sodium can be easily washed out of the cake.

A particular advantage of the alumina hydrate prepared according to the process herein is that whereas crystalline alumina hydrate is not capable of being extruded, the rheological properties of the alumina hydrate of this invention are such that it is. The finely divided, alumina cake can be kneaded using a small quantity of water. The kneaded alumina cake can then be extruded, dried and calcined, forming extrudates eminently suitable as catalyst supports. Generally, the partially dried alumina cake will be kneaded to form the extrudible alumina. By definition this cake, freed of chemically uncombined water, is the precursor alumina hydrate intended when the term is used herein.

DETAILED DESCRIPTION OF THE INVENTION

Carbon dioxide is known as an acid precipitant for basic aluminum salts. For example, it is disclosed in U.S.

2,894,898. However, no distinction is made between its use and the use of any other acid precipitant such as nitric acid. According to this invention it has been found that mineral acid-sodium aluminate reaction conditions do not adequately apply to carbon dioxide neutralization. Particularly the invention is based on the discovery of a new set of reaction conditions for carbon dioxide resulting in the superior catalyst precursor alumina hydrate described. As an example of the difference in reaction conditions the following can be considered.

TABLE I.—CALCINED PRODUCT

| Precip. agent | Conc. at pptn., percent | pH of pptn. | SA,[1] m.²/gm. | Pore vol., cc./gm. | | Powder density, lbs./ft.³ | H²O pick-up, cc./gm. |
|---|---|---|---|---|---|---|---|
| | | | | <800 A. | <140 A. | | |
| $CO_2$ | 7.0 | 9.8+,[2] | 275 | .31 | .26 | 51.6 | 0.4 |
| $HNO_3$ | 7.0 | 9.8+,[2] | 321 | .43 | .32 | 18.2 | 1.85 |

[1] SA = Surface Area.

Table I shows that when precipitating at an aluminate concentration of 7 percent, the surface area of the carbon dioxide-precipitated alumina is almost as high as the nitric acid-precipitated product. However due to precipitation conditions the density of the carbon dioxide precipitant is much too high. Under the precipitation conditions given, mineral acid-precipitated alumina hydrate composition has satisfactory surface area and pore volume values, whereas the carbon dioxide-precipitated material does not.

This invention provides a process for preparing a precursor alumina hydrate resulting in a catalyst having excellent density, surface area, and pore volume. The catalyst of this invention is an alumina hydrate capable of being extruded, having 2.25 to 3.0 mol water per mol of $Al_2O_3$, consisting of 25 to 50 weight percent of an alumina, characterized by an X-ray diffraction pattern having lines at 1.8–1.9 angstroms, 2.3–2.4 angstroms, 3.1–3.2 angstroms and 6.2–6.7 angstroms, the strongest line being in the range between 6.2–6.7 angstroms and by an average crystallite size in the pseudoboehmite range of 15 to 30 angstrom units. This psuedoboehmite is in admixture with 40 to 60 weight percent of amorphous alumina containing 3 to 3.5 mols of water per mol of $Al_2O_3$ and with not more than 10 percent beta alumina trihydrate, the total being 100 percent. The catalyst is prepared by precipitating alumina in hydrous form from an aqueous solution of the soluble aluminate, desirably an alkali metal aluminate, by reaction of the aluminate with carbon dioxide at a temperatre in the range of 80° F. to 100° F. with a total concentration of aluminate of 0.5 to 2.0 percent by weight calculated as $Al_2O_3$. During the precipitation the pH is maintained within the critical range of 9.6 to 10.0. The relative proportions of the aluminate and carbon dioxide are maintained sufficient to produce said pH during the precipitation. The temperature and concentration are controlled within said range along with the pH to produce a slurry of alumina which when filtered and dried can be kneaded to produce the extrudible catalyst base.

The process of my invention, as well as the effectiveness of catalysts resulting therefrom, can perhaps best be understood by reference to specific examples and catalyst evaluations, the examples being for the purpose of illustration only since they will exemplify only various features of the invention.

EXAMPLE I

From Bayer alumina 200 grams of a sodium aluminate solution containing 117 grams of sodium aluminate were prepared by the reaction of 94 grams of the Bayer alumina trihydrate with 106 grams of a 50 percent solution of sodium hydroxide. The 200 gram 58.5 percent solution of sodium aluminate was diluted to a total weight of 4,000 grams with water making the sodium aluminate concentration 2.93 percent. This 1.83 percent sodium aluminate solution expressed as $Al_2O_3$ was metered into a precipitator at a rate of 38 cc. per minute. Sufficient gaseous carbon dioxide was bubbled through the sodium aluminate solution to neutralize the solution causing alumina to precipitate. The pH was maintained at a constant value of 9.8. This was done by monitoring the pH of the solution during the carbon dioxide addition until the reaction was completed. Since the constant pH of 9.8 was maintained, it was unnecessary to measure the carbon dioxide employed. During the entire precipitation the temperature was held at 90° F. When all of the sodium aluminate solution was precipitated as alumina, the material was washed and dried sufficiently to form a cake devoid of non-chemically combined water. The cake had the following properties:

X-ray diffraction pattern

| "d" spacing (angstroms): | Intensity ($I/I_0$) |
|---|---|
| 6.32 to 6.50 | 100 |
| 3.17 | 57 |
| 2.35 | 43 |
| 1.86 | 32 |
| 1.85 | 27 |

Average cystalline size—25 A.
Refractive index—1.66
Bulk Density (lbs./ft.³) (calcined)—16
Surface area (calcined)—400 m.²/gm.

Following Example I, but maintaining various neutralization pH's, several alumina hydrate compositions were produced, one at each pH. The sodium during neutralization was 0.5, 1.0 or 1.5 percent expressed as $Al_2O_3$. Results of these preparations at various pHs and strike concentrations are given in Table II.

TABLE II

| | Precursor | | Calcined product | | | |
|---|---|---|---|---|---|---|
| pH | Strike conc., percent | Solids in cake, percent | Density, lbs./ft.³ | Surface area, m.²/gm. | Pore vol., cc./mg. | |
| | | | | | <800 A. | <140 A. |
| 9.6 | 0.5 | 19.3 | 21.2 | 217 | 0.76 | 0.28 |
| 9.8 | 0.5 | 22.0 | 15.6 | 234 | 0.96 | 0.43 |
| 10.0 | 0.5 | 27.0 | 12.5 | 247 | 0.91 | 0.47 |
| 10.2 | 0.5 | 27.5 | 15.0 | 295 | 0.80 | 0.40 |
| 8.0 | 1.0 | 10.5 | 40.3 | 343 | 0.49 | 0.35 |
| 8.5 | 1.0 | 7.4 | 45.3 | 250 | 0.36 | 0.31 |
| 9.0 | 1.0 | 9.7 | 49.0 | 226 | 0.36 | 0.29 |
| 9.7 | 1.0 | 16.0 | 22.1 | 380 | 0.70 | 0.41 |
| 9.9 | 1.0 | 27.0 | 15.0 | 340 | 0.83 | 0.59 |
| 11.0 | 1.0 | 14.2 | 41.0 | 320 | 0.44 | 0.37 |
| 9.6 | 1.5 | 16.0 | 31.5 | 206 | 0.57 | 0.29 |
| 9.8 | 1.5 | 23.0 | 15.9 | 308 | 0.84 | 0.43 |
| 10.0 | 1.5 | 27.0 | 16.7 | 262 | 0.70 | 0.45 |
| 10.2 | 1.5 | 28.0 | 19.6 | 183 | 0.59 | 0.46 |

The foregoing data show that alumina having the best properties is obtained at a strike pH around 9.8. This is particularly true of pore volumes below 800 A. obtained on calcination.

The properties of the precipitate at the various pH's are well exhibited by settling rates, filtering rates, and the rheology of the precipitate. Analytically, different pseudoboehmite phases seem to be formed at each of the precipitation pH's 9.6 and 9.8 and 10 within the range. In addition at a precipitation pH of 9.6 the crystalline phase is only that having the pseudoboehmite properties. At a pH of 9.8 the X-ray scan shows a trace of beta alumina trihydrate which increases to five to ten percent in the case of pH 10 precipitations.

Alumina hydrate precipitated at a pH of 8 to 8.5 exhibits gelatinous properties. It has a high surface area and small pores. The gelatinous material tends to remain in suspension whereas crystalline material has a fast settling rate. The gelatinous material is also characterized by the fact that very little of the water can be removed from the filter does not have the properties of hte gelat- hydrate in the filter cake has the rheological properties of cold cream.

The material precipitated at a pH of about 11 has a fast settling rate. It is easy to wash, has a high density, and is crystalline. This crystalline cake, when removed from the filter does not have the properties of the gelainous material, but rather is in the form of distinct particles. Upon calcining to remove water the material becomes very light in density. It has the rheological properties of powder and is too fluffy to be extrudible.

The material of this invention, precipitated at a pH of 9.6 to 10, has the desired density and catalytic properties of the crystalline material, but rheological properties of the gelatinous material. The settling rate of this alumina is much greater than that of the amorphous material; it is easier to wash than the amorphous alumina; and sodium can be much more readily removed. These properties are given in the following table for various strike pH values.

TABLE III

| Strike pH | Percent Na in initial cake | Settling rate [1] | Percent water retention | Density, lbs./ft.$^3$ |
|---|---|---|---|---|
| 8.0 | 9.0 | 3 hrs | 88 | 48 |
| 8.5 | 6.0 | 2 hrs | 88 | 34 |
| 9.6 | 4.7 | 1.5 hrs | 81 | 12 |
| 9.8 | 3.1 | 20 min | 79 | 9 |
| 10.0 | 2.8 | 10 min | 75 | 8 |
| 10.2 | 2.4 | 5 min | 60 | 11 |

[1] Time for 90 percent of the precipitate to settle.

From Table III it is readily apparent that the alumina of this invention is a mixture of amorphous and crystalline aluminas. The sodium retention, water retention, and settling rates are higher than those of crystalline alumina, but are not as low as those of amorphous alumina. The density is intermediate between the two. The rheological properties are such that an alumina is produced which can be extruded without aging.

Another example of the fact that the conditions employed herein are unique within the wide range disclosed in the prior art for carbon dioxide and nitric acid, the two being considered equivalent, is illustrated in Table IV. In order to compare the application of the conditions of this invention to carbon dioxide with the application of the conditions to nitric acid Table IV is given. The carbon dioxide-prepared alumina was made according to Example I. The nitric acid-precipitated alumina was prepared under the same conditions.

As can be seen from Table IV, alumina precipitated by nitric acid under the conditions contemplated herein has a surface area which is slightly lower but compares with that produced by carbon dioxide. The pore volumes however are completely unsatisfactory. The alumina prepared with nitric acid has a total volume of pores of less than 800 A. of .27 cc. per gram. The alumina made with carbon dioxide, on the other hand, has a pore volume, in this range, of 1.02 cc. per gram.

The uniqueness of the preparation process of this invention is further illustrated by the effect of sodium on the alumina prepared by the process. Aluminas commercially available for use as catalyst bases are adversely affected by the presence of sodium. Sodium must be thoroughly washed out of these compositions. Disadvantages of sodium, usually present as $Na_2O$ in alumina catalysts are widely recognized in such patents as 2,769,688; 2,474,440; 3,066,012, etc., wherein sodium (0.2 $Na_2O$, dry basis) is held to induce poor thermal stability, reduce selectivity, as well as activity, and to make the catalysts more difficult to reactivate. However, it can be shown that this is not the case with the alumina of this invention.

The sodium aspect of this invention is best illustrated by hydrogenation processes. A desirable catalyst for such hydrogenation processes is an alumina catalyst impregnated with 0.1 to 1 percent palladium, generally around 0.5 percent. The effect of sodium on this catalyst will be apparent from the data in Table V. The gas stream subjected to the hydrogenation reaction was as follows (in percent): $H_2$—2.0; $C_2H_2$—1.0; $C_2H_4$—97.0. Hydrogenation conditions are set forth in the table. For the purpose of comparison two commercially available catalysts were purchased containing sodium. These catalysts are designated Commercial A and Commercial B. The catalyst of the invention was the catalyst prepared according to Example I, but the catalyst was calcined at 2,400° F. to reduce the normally high surface area Sodium in this catalyst was determined by the number of washings. The resulting low surface areas are given in the table, the catalyst of the invention being made by dipping or spraying the alumina of Example I with 0.5 percent palladium.

TABLE V

| Catalyst | Na, percent | SA [1] | Temp., °F. | SV [2] | $C_2H_2$ out, p.p.m. | $H_2$ out, p.p.m. |
|---|---|---|---|---|---|---|
| Commercial A | 0.2 | 8 | 150-160 | 8,000 | 0.25 | 38 |
| Example I | 0.3 | 8 | 124 | 8,000 | 0 | 1,106 |
| Do | 0.3 | 8 | 115 | 8,000 | 239 | 4,176 |
| Commercial B | 0.3 | 37 | 160-170 | 8,000 | 217 | 0 |
| Example I | 0.15 | 13 | 125 | 8,000 | 0 | 970 |
| Do | 0.15 | 13 | 130 | 8,000 | 0 | 390 |
| Do | 0.85 | 215 | 140 | 2,000 | 15 | 466 |

[1] SA = Surface Area (m.$^2$/gm.).
[2] SV = Space Velocity (volume of gas per volume of catalyst per hour).

Reference to Table V shows that a quantity of sodium of less than 1 percent does not harm the catalyst of this invention whereas the two commercial catalysts are not satisfactory for this hydrogenation. Since the ratio of hydrogen to acetylene is 2 to 1, large quantities of hydrogen must remain after the hydrogenation. The disappearance of hydrogen indicates that ethylene has been hydrogenated. The combination of a low acetylene content ($C_2H_2$ Out) with a low hydrogen content ($H_2$ Out) indicates not only that ethylene is being hydrogenated but that acetylene is polymerizing during the process. Desirably therefore, $H_2$ Out should be high. With the catalyst

TABLE IV.—CALCINED PRODUCT

| Precip. agent | Conc. at pptn., percent | pH of pptn. | Surface area, m.$^2$/gm. | Pore vol., cc./mg. | | Powder density, lbs./ft.$^3$ | $H_2O$ pickup, cc./gm. |
| | | | | <800 A. | <140 A. | | |
|---|---|---|---|---|---|---|---|
| $CO_2$ | 1.5 | 9.8±.$^2$ | 311 | 1.02 | .30 | 15.96 | 2.0 |
| $HNO_3$ | 1.5 | 9.8±.$^2$ | 274 | .27 | .25 | 43.70 | 0.89 | of the invention $H_2$ Out was 1,000 to 4,000 p.p.m. whereas with commercial catalysts it was 38 p.p.m. In the case of commercial catalyst B all of the hydrogen was consumed. In corresponding runs the hydrogen was in the range of 300 to 900 p.p.m. Polymer studies also indicate that a correspondingly greater quantity of polymer was formed using the two commercial catalysts rather than a catalyst of the invention. The alumina of this invention thus is an outstanding carrier for hydrogenation catalysts.

To further illustrate the invention, the following example is given exemplifying the carbon dioxide-precipitated alumina preparation of the invention as now employed on a commercial scale.

EXAMPLE II

From a Bayer alumina 4000 pounds of a 40 percent sodium aluminate solution were prepared. This 4000 pound sodium aluminate solution was diluted with water to a total weight of 200,000 pounds to make a 0.8 percent sodium aluminate solution (0.5 percent based on $Al_2O_3$). The precipitation procedure was the same as that described in Example I. The diluted sodium aluminate solution was pumped into the plant precipitator at a rate of 100 gallons per minute, the pH being automatically controlled at 9.8. The pH was maintained at the 9.8 value by a pH meter which introduced or shut off carbon dioxide as required to maintain the pH. The temperature of the system was controlled by the use of steam, and was maintained at 90° F. The 0.5 percent alumina solution thus produced was washed and the dried precursor had properties, determined by X-ray and the other methods, very similar to those resulting from the process of Example I.

On heating the precursor of this invention the crystalline phase is converted to gamma alumina and a catalyst base results having the majority of its pores in the size range of less than 140 angstroms to 800 angstroms. Thus the distribution of pores in the case of a cake precipitated at a pH of 9.8 and then calcined is: 25.6 percent less than 50 angstroms, 67.4 percent in the range of 50 to 180 angstroms, 6 percent in the range of 180 to 350 angstroms and 1 percent above 350 angstroms in size. Total pore volumes and average pore diameters were determined in the case of calcined products precipitated at pH's of 9.6, 9.8 and 10.0. These were:

| pH | Total pore vol., cc./gm. | Average pore diameter, A. |
| --- | --- | --- |
| 9.6 | 0.8 | 114 |
| 9.8 | 1.0 | 133 |
| 10.0 | 0.7 | 112 |

One of the most important features of this invention is that the pore characteristics of the catalyst derived by heating the precursor of this invention are especially suited to hydrotreating reactions. Hence the catalyst base resulting from the calcination of the precursor is particularly effective when impregnated with Group VIII or Group VI-B metals, for use in desulfurization, denitrification, and hydrogenation of polyaromatic compounds.

The advantages of using the alumina of this invention as catalyst bases can be further illustrated by its use in the hydrofining of pyrolysis gasoline. In the hydrogenation of pyrolysis gasoline only diolefins are to be hydrogenated, selectivity being between the diolefins and monoolefins. It has been found that the alumina of this invention when impregnated with 0.05 to 0.2 percent palladium is an outstanding catalyst for stabilizing pyrolysis gasoline by selective hydrogenation. An alumina prepared by this invention with a surface area of 100 to 500 square meters per gram permits the conversion of diolefins to monoolefins at a temperature lower than those previously employed. Thus whereas catalysts previously employed required temperatures of at least 500° F., the hydrogenation using this catalyst can be effected at a temperature in the range of 150 to 300° F.

The advantages of the hydrogenation process of the invention can best be seen by comparing data on raw and stabilized pyrolysis gasoline. In the following tables, results obtained by selectively hydrogenating diolefins in pyrolysis gasoline streams from three different oil companies are given. The induction period is a test property that is a measure of both existent and potential gums. The catalyst employed is the 0.1 percent palladium prepared according to Example II.

TABLE VI.—SELECTIVE HYDROGENATION OF PYROLYSIS GASOLINE

| | Raw pyrolysis gasoline | Stable gasoline |
| --- | --- | --- |
| Gravity, ° API | 39.2 | 41 |
| Maleic anhydride value | | |
| Bromine number | 56 | 44 |
| Induction period, hrs | 1.0 | 17 |
| Existent gum, mg./100 ml | 2 | 1 |
| Potential gum | 3,000 | 4–8 |
| Hydrogenation conditions: | | |
| Temperature, ° F | | 250 |
| Pressure, p.s.i | | 200 |
| LHSV | | 2 |
| $H_2$ circulation, cu. ft./bbl | | 1,000 |

TABLE VII.—SELECTIVE HYDROGENATION OF PYROLYSIS GASOLINE

| | Raw pyrolysis gasoline | Stable gasoline |
| --- | --- | --- |
| Gravity, ° API | 30.1 | 31.4 |
| Maleic anhydride value | | 2.51 |
| Bromine number | 56.5 | 36 |
| Induction period | 2 hr. 45 min. | 16+hr. |
| Existent gum, mg./100 ml | 74 | 39 |
| Potential gum | 9,485 | 0–5 |
| Hydrogenation conditions: | | |
| Temperature, ° F | | 212 |
| Pressure, p.s.i | | 450 |
| LHSV | | 2 |
| $H_2$ circulation, cu. ft./bbl | | 1,000 |

TABLE VIII.—SELECTIVE HYDROGENATION OF PYROLYSIS GASOLINE

| | Raw pyrolysis gasoline | Stable gasoline |
| --- | --- | --- |
| Gravity, ° API | 52.5 | 51 |
| Maleic anhydride value | 94.0 | .1 |
| Bromine number | 54 | 28 |
| Induction period, hrs | 0.2 | 16+ |
| Existent gum, mg./100 ml | 48 | 40 |
| Potential gum | 4,970 | 0–10 |
| Octane number, CFRR-clear | 90 | 88 |
| Hydrogenation conditions: | | |
| Temperature, ° F | | 250 |
| Pressure, p.s.i | | 450 |
| LHSV | | 2 |
| $H_2$ circulation, cu. ft./bbl | | 1,000 |

The foregoing results show that when stabilized, using the catalyst of this invention, the induction period is raised from less than three hours to more than sixteen hours, In addition potential and existent gums are substantially reduced. There was virtually no change in octane number, specific gravity and boiling ranges. In a subsequent step the monoolefins are removed by hydrogenation in an olefin saturation reactor operated as follows. The catalyst used is a 3.5 percent cobalt-15 percent molybdenum catalyst.

Olefin saturation reactor

Product:

| | |
| --- | --- |
| Feedstock phase | Gas. |
| Inlet temperature | 550° F.–700° F. |
| Operating pressure | 200 p.s.i.g. (minimum). |
| LHSV (space velocity) | 0.5–2.0. |
| $H_2$ circulation | 500 to 1,000 s.c.f./bbl. |
| Size and form | 1/16 inch extrusions. |
| On stream cycle | 3–6 months (minimum). |
| Regeneration | Steam and air at elevated temperature. |
| Maleic anhydride value | 0. |
| Bromine number | 1. |

The product stream leaving either hydrogenation reactor is cooled, passed through a high pressure separator to remove excess hydrogen, which is recycled, and finally stabilized to remove any light ends. In both stages of hydrogenation the catalyst life is two years or longer.

As can be seen, according to the practice of this invention an alumina precursor is provided which is eminently suitable for a variety of uses. As a catalyst base the alumina of this invention, in many instances, out performs catalysts composited with other aluminas. In addition the process provides an alumina containing both crystalline and amorphous materials without the need for aging. It is obvious that the alumina can be modified for various purposes. Such modifications will be obvious to one skilled in the art. Thus the high surface area catalyst normally resulting can be calcined at very high temperatures to reduce the surface area for other purposes. The alumina can also be employed by the pharmaceutical industry. These variations will be obvious from the foregoing description. Such ramifications are deemed to be within the scope of this invention.

What is claimed is:

1. A process for preparing an alumina hydrate catalyst base precursor in the form of an alumina precipitate capable of being extruded, having 2.25 to 3.0 mol water per mol of $Al_2O_3$ and consisting essentially of a pseudoboehmite in admixture with amorphous alumina which comprises precipitating alumina in hydrous form from an aqueous solution of a soluble metal aluminate by reaction of the aluminate with carbon dioxide
at a temperature of 80° F. to 100° F., and at a total concentration of aluminate of 0.5 to 2.0 percent by weight, based on $Al_2O_3$,
maintaining the pH during said precipitation within the range of 9.6 to 10.0,
the relative proportions of the aluminate and carbon dioxide being sufficient to produce said pH during the precipitation, and
controlling the temperature and concentration within said range along with the pH to produce the precipitate, and
drying the precipitate to remove chemically uncombined water from the precipitate to produce the catalyst precursor.

2. The process of claim 1 wherein the metal aluminate is sodium aluminate made by the reaction of Bayer process alumina with sodium hydroxide.

3. The process of claim 1 wherein the metal aluminate is sodium aluminate, wherein the pH is 9.8 and wherein the temperature is 90° F.

4. The process of claim 3 wherein the precipitate is water washed to reduce sodium to a value of 0.05 to 1 percent.

5. A process for preparing an alumina catalyst base which comprises precipitating alumina in hydrous form from an aqueous solution of a soluble metal aluminate by reaction of the aluminate with carbon dioxide at a temperature of 80° F. to 100° F., and at a total concentration of aluminate of 0.5 to 2.0 percent by weight, based on $Al_2O_3$, maintaining the pH during said precipitation within the range of 9.6 to 10.0, the relative proportions of the aluminate and carbon dioxide being sufficient to produce said pH during the precipitation, and controlling the temperature and concentration within said range along with the pH to produce the precipitate, water washing the precipitate to reduce the sodium content thereof to a value of less than 0.05 percent, drying the precipitate to remove chemically uncombined water from the precipitate to produce a hydrate precursor having 2.25 to 3.0 mol water per mol of $Al_2O_3$ and consisting essentially of a pseudoboehmite in admixture with amorphous alumina, and extruding and calcining the precursor.

6. The process of claim 5 wherein the metal aluminate is sodium aluminate, wherein the pH is 9.8 and wherein the temperature is 90° F.

References Cited

UNITED STATES PATENTS

| | | | |
|---|---|---|---|
| 2,988,520 | 6/1961 | Braithwaite | 23—143 XR |
| 2,943,065 | 12/1955 | Braithwaite | 23—143 XR |
| 3,268,295 | 8/1966 | Arnbrust | 23—141 |
| 2,973,245 | 2/1961 | Teter | 23—141 |
| 2,894,898 | 7/1959 | Oettinger | 208—112 |
| 2,980,632 | 4/1961 | Malley | 252—465 |
| 3,161,586 | 12/1961 | Watkins | 208—264 |
| 3,125,511 | 3/1964 | Tupman | 208—264 |
| 3,182,015 | 5/1965 | Kronig | 208—255 |

DANIEL E. WYMAN, Primary Examiner

R. M. FRENCH, Assistant Examiner

U.S. Cl. X.R.

23—52, 143